April 17, 1962 K. ZEILE ET AL 3,030,263
SYNERGISTIC FUNGICIDAL COMPOSITIONS
Filed July 19, 1960
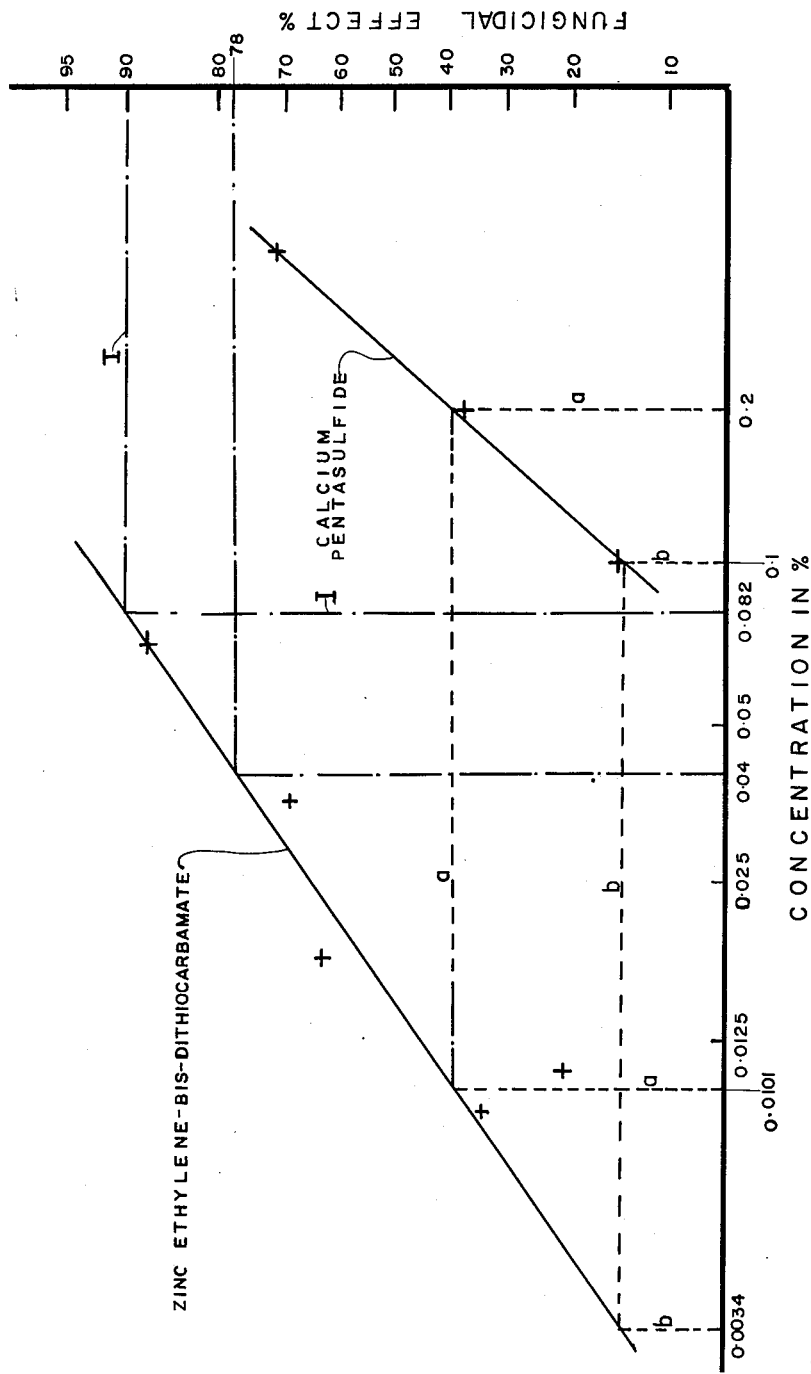
INVENTORS
KARL ZEILE
RICHARD SEHRING
PETER SCHICKE
BY
Hammond + Littell
ATTORNEYS

3,030,263
SYNERGISTIC FUNGICIDAL COMPOSITIONS

Karl Zeile, Richard Sehring, and Peter Schicke, Ingelheim, Germany, assignors to C. H. Boehringer Sohn, Ingelheim (Rhine), Germany, a limited partnership
Filed July 19, 1960, Ser. No. 43,815
Claims priority, application Germany July 23, 1959
4 Claims. (Cl. 167—14)

This invention relates to fungicidal compositions and more particularly to fungicidal compositions containing dithiocarbamic acid salts and calcium polysulfides as active ingredients.

It is known that thiocarbamates have excellent fungicidal properties and are useful in combatting numerous phytopathogenic fungi. However, they are not effective against true mildew fungi (Erysiphaceae family). It is further known that calcium polysulfides are useful in combatting plant diseases caused by fungi, but they are primarily effective against true mildew fungi. It is also known to use barium polysulfide to combat fungi. A combination of barium polysulfide with tetramethylthiuram-disulfide is not possible, as indicated in the Plant Protection Summary of Bayer, page 48.

Thiocarbamates are generally relatively expensive compounds, but they exhibit a good plant compatibility. In contrast, thereto, calcium polysulfides are substantially cheaper, but they readily lead to undesirable damage to the plants in higher concentrations.

We have now surprisingly found that a mixture containing a thiocarbamate and a calcium polysulfide exhibits a considerable synergistic effect with respect to the fungicidal activity. In other words, the fungicidal activity of such a composition far exceeds the expected additive effect of the individual components.

Within the general scope of the present invention we have found that the combination of zinc ethylene-bis-dithiocarbamate and calcium pentasulfide is particularly effective. The effectiveness of the composition according to the invention was determined by tests on tomato seedlings artificially infected with Phytophthora infestans and by tests on small rye plants artificially infected with Erysiphe graminis.

Test procedure: The test plants were sprayed with aqueous suspensions or solutions of fungicidal compositions according to the invention and, after drying of the spray coating, the plants were artificially infected with the fungi. The infection with Phytophthora infestans was accomplished by means of a spore suspension of this fungus which contained 60 to 120,000 spores per cubic centimeter; the infection with Erysiphe graminis was accomplished by means of dry-dusting of the test plants with Erysiphe conidia. The tomato plants were subsequently introduced for 49 hours into a climate chamber with steam-saturated air at 20° C. The area of fungus attack then appeared as necrotic spots on the leaves. The fungicidal evaluation was accomplished by estimating the portion of the destroyed leaf surface on the total leaf surface which was then compared with the damage done to the leaves of untreated plants. The damage done to control plants which had not been treated with a fungicidal agent was then given an arbitrary value of 100. The incubation period with Erysiphe graminis was 5 to 7 days. The fungus developed under a normal green-house climate and after this period formed white pustules, which were counted on a leaf section 2 cm. long and which were also related to untreated control plants.

The above test is described in the literature by P. Schicke, "Uber eine einfache Versuchsanordnung der Fungicidteste mit Phytophthora infestans" (Mont.) de By. Nachrichtenbl. Deutsch. Pflanzenschutzd. (Braunschweig) 7, pages 120 to 122 (1956).

The attached drawing represents a graph showing the individual fungicidal effects of zinc ethylene-bis-dithiocarbamate and calcium pentasulfide, respectively, as a function of their concentration, on the tomato seedlings (inoculated with Phytophthora infestans). The dotted lines a and b show the concentrations of the two active ingredients which have the same fungicidal effect. These values are summarized in Table 1. The equivalent fungicidal effect for the individual concentrations of the two components is indicated in the last column of Table 1.

Table 1.—Concentration (in Percent by Weight) of Equal Fungicidal Activity of Zinc Ethylene-Bis-Dithiocarbamate and Calcium Pentasulfide in an Inert Carrier

| Calcium Pentasulfide | Zinc ethylene-bis-dithiocarbamate | Equivalent Fungicidal Effect |
|---|---|---|
| Percent | Percent | Percent |
| 0.2 | 0.0101 | 40 |
| 0.1 | 0.0034 | 14 |
| 0.5 | 0.0011 | 3 |
| 0.025 | 0.0004 | 0.3 |
| 0.0125 | 0.0001 | 0.02 |

With the aid of the values shown in Table 1 and with the aid of the graph it is possible to express the fungicidal effect of calcium pentasulfide in terms of zinc ethylene-bis-dithiocarbamate equivalents and vice versa. On the basis of these values it is, in turn, possible to determine the expected theoretical additive fungicidal effect of a composition containing both of the components in varying quantitative ratios. This shall be further explained with the aid of the following example: Let us say that a composition contains 0.2% by weight calcium pentasulfide and 0.072% by weight zinc ethylene-bis-dithiocarbamate. From the graph it may be determined that 0.2% calcium pentasulfide are equivalent to 0.01% zinc ethylene-bis-dithiocarbamate (dotted line a). In order to determine the theoretical total fungicidal effect, the two values of 0.072 and 0.010 for zinc ethylene-bis-dithiocarbamate are added. The graph shows that a concentration of 0.082% by weight zinc ethylene-bis-dithiocarbamate corresponds to an expected fungicidal effect of 90% (broken line I in the graph). However, the actual fungicidal effect of such a composition, determined by experiment, is 99%.

In Table 2 the theoretical fungicidal effect of compositions containing various concentrations of zinc ethylene-bis-dithiocarbamate and calcium pentasulfide is compared with the fungicidal effect actually found.

Table 2.—Synergistic Fungicidal Effect of a Composition According to the Invention Against Phytophthora infestans on Tomatoes, the Active Ingredient Mixture Containing 25.6% by Weight Zinc Ethylene-Bis-Dithiocarbamate (I) and 74.4% by Weight Calcium Pentasulfide (II)

| Concentration Percent of Active Ingredients in Overall Composition | | Fungicidal Effect in Percent | | Synergistic Increase in Fungicidal Effect Percent |
|---|---|---|---|---|
| I | II | Additive Expected | Actually Found | |
| 0.072 | 0.2 | 90 | 99 | +9 |
| 0.036 | 0.1 | 78 | 95 | +17 |
| 0.018 | 0.05 | 57 | 85 | +28 |
| 0.009 | 0.025 | 37 | 75 | +38 |
| 0.0045 | 0.0125 | 20 | 42 | +22 |

The synergistic increase in fungicidal effect is clear from the values shown in the last column of Table 2.

Since the synergistic effect is clearly proven with the aid of the preceding examples, the following tables merely show the synergistic increase in fungicidal effect for additional varying quantitative ratios and other dithiocarbamates.

Table 3.—Synergistic Increase in Fungicidal Effect of Compositions Containing Mixture of Zinc Ethylene-Bis-Dithiocarbamate (I) and Calcium Pentasulfide (II) at Various Quantitative Ratios (Phytophthora infestans, Tomatoes)

| I. 41.8% II. 58.2% | | I. 25.6% II. 74.4% | | I. 14.9% II. 85.1% | |
|---|---|---|---|---|---|
| Concentration of Active Ingredient Mixture, percent | Synergistic Increase in Effect Above Theory, percent | Concentration of Active Ingredient Mixture, percent | Synergistic Increase in Effect Above Theory, percent | Concentration of Active Ingredient Mixture, percent | Synergistic Increase in Effect Above Theory, percent |
| 0.344 | +0.7 | 0.270 | +9 | 0.470 | +6 |
| 0.172 | +6.2 | 0.135 | +17 | 0.235 | +12 |
| 0.086 | +15.9 | 0.067 | +28 | 0.118 | +19 |
| 0.043 | +23.7 | 0.034 | +38 | 0.059 | +33 |
| 0.002 | +8.8 | 0.017 | +22 | 0.029 | +33 |

Table 4.—Synergistic Increase in Fungicidal Effect of Compositions Containing Disodium-Ethylene-Bis-Dithiocarbamate (IV) or Zinc-Dimethyl-Dithiocarbamate (III) and Calcium Pentasulfide (II) at Various Quantitative Ratios (Phytophthora infestants, Tomatoes)

| III. 28.7% II. 71.3% | | IV. 16.3% II. 83.7% | |
|---|---|---|---|
| Concentration of active ingredient mixture, percent | Synergistic increase in effect above theory, percent | Concentration of active ingredient mixture, percent | Synergistic increase in effect above theory, percent |
| 0.282 | +28 | 0.24 | +4 |
| 0.141 | +27 | 0.12 | +6 |
| 0.071 | +20 | 0.06 | +8 |

The following table shows that not only the effect of the thiocarbamates against those fungi on which they already exhibit a good effect is synergistically increased, but also that the effect of the calcium pentasulfide against true mildew fungi is synergistically increased, which is of particular importance in actual practice.

Table 5.—Synergistic Increase in Fungicidal Effectiveness of Various Compositions Containing a Mixture of Calcium Pentasulfide (II) and Zinc Ethylene-Bis-Dithiocarbamate (I) Against Erysiphe graminis on Rye

| I. 25.5% II. 74.5% | |
|---|---|
| Concentration of active ingredient mixture, percent | Synergistic Increase in effect above theory, percent |
| 0.135 | +26 |
| 0.068 | +24 |
| 0.034 | +42 |

The active ingredient mixture according to the present exhibits the following advantages over the dithiocarbamate or calcium polysulfide alone:

(1) The mixture is more effective than its individual components, so that up to 50% of the quantity of dithiocarbamate can be saved.

(2) The mixture has a greater effective range.

The active ingredient mixture according to the invention preferably comprises between 0.01 and 5% by weight of a salt of dithiocarbamic acid and between 0.005 and 10% by weight of a calcium polysulfide, based on the total composition applied, that is including the inert carrier.

Particularly useful are the following dithiocarbamates:
Zinc ethylene-bis-dithiocarbamate
Manganese ethylene-bis-dithiocarbamate
Sodium ethylene-bis-dithiocarbamate
Zinc dimethyl-dithiocarbamate
Iron ethylene-bis-dithiocarbamate The compositions according to the invention are employed in those forms which are customarily used for fungus control, for example as suspensions, dusting powders or solutions in inert carriers. The following examples will further illustrate the invention, the parts being parts by weight.

(1) Suspension:
67 parts calcium pentasulfide
23 parts zinc ethylene-bis-dithiocarbamate
7 parts kaolin
3 parts naphthalene sulfonate The individual components are intimately admixed by milling and are then diluted with water to the desired concentration of the active fungicidal components.

(2) Solution: 13 parts sodium ethylene-bis-dithiocarbamate, 13 parts calcium pentasulfide and 4 parts naphthalene sulfonate are dissolved in 70 parts water, and the resulting solution is diluted to the desired concentration of the active fungicidal components.

(3) Dusting powder: 5 parts manganese ethylene-bis-dithiocarbamate and 10 parts calcium pentasulfide are thoroughly admixed with 85 parts kaolin by milling until a homogeneous dusting powder is obtained.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:

1. Fungicidal compositions comprising from 0.01 to 5% by weight of a salt of a dithiocarbamic acid selected from the group consisting of zinc ethylene-bis-dithiocarbamate, manganese ethylene-bis-dithiocarbamate, sodium ethylene-bis-dithiocarbamate, zinc, dimethyl-dithiocarbamate and iron ethylene-bis-dithiocarbamate, and from 0.05 to 10% by weight of calcium pentasulfide.

2. Fungicidal compositions comprising from 0.01 to 5% by weight of zinc ethylene-bis-dithiocarbamate and from 0.05 to 10% by weight of calcium pentasulfide.

3. Fungicidal compositions comprising from 0.01 to 5% by weight of zinc dimethyl-dithiocarbamate and from 0.05 to 10% by weight of calcium pentasulfide.

4. Fungicidal compositions comprising from 0.01 to 5% by weight of disodium ethylene-bis-dithiocarbamate and from 0.05 to 10% by weight of calcium pentasulfide.

References Cited in the file of this patent

UNITED STATES PATENTS

Re. 23,742    Hester _____ Nov. 24, 1953
1,517,522    Volck _____ Dec. 2, 1924